United States Patent
Czesak et al.

(10) Patent No.: US 6,213,756 B1
(45) Date of Patent: Apr. 10, 2001

(54) EXTRUSION BLOW MOLDING APPARATUS FOR MANUFACTURE OF THERMOPLASTIC CONTAINERS

(75) Inventors: Theodore M. Czesak, Perrysburg; Thomas J. Krall, Toledo, both of OH (US); William P. Atkins, Merriam, KS (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 0 days.

(21) Appl. No.: 09/288,208

(22) Filed: Apr. 8, 1999

(51) Int. Cl.[7] .............. B29C 49/50; B29C 49/58; B29C 49/64
(52) U.S. Cl. .................. 425/525; 425/535; 425/537; 425/806
(58) Field of Search .................. 425/525, 535, 425/537, 806

(56) References Cited

U.S. PATENT DOCUMENTS

| | | | |
|---|---|---|---|
| 3,209,401 | * 10/1965 | Mehnert . | |
| 3,585,683 | 6/1971 | Wilson | 425/525 |
| 3,597,793 | 8/1971 | Weiler | 425/525 |
| 3,657,406 | 4/1972 | Delebarre | 425/527 |
| 3,769,394 | 10/1973 | Latreille | 425/525 |
| 3,769,793 | 11/1973 | Wilson | 60/39.161 |
| 3,869,237 | 3/1975 | Hellmer et al. | 425/527 |
| 4,116,607 | * 9/1978 | LeGrand | 425/525 |
| 4,187,070 | * 2/1980 | Martin, Jr. | 425/525 |
| 4,382,769 | * 5/1983 | Younkin et al. | 425/525 |
| 5,054,272 | 10/1991 | Dundas | 425/525 |
| 5,256,055 | 10/1993 | Morris | 425/527 |
| 5,629,032 | 5/1997 | Pennino | 425/525 |

* cited by examiner

Primary Examiner—Robert Davis

(57) ABSTRACT

Extrusion blow molding apparatus (10) having a blow mold (12), a neck mold (14) positioned above the blow mold and an anvil (30) positioned in an outwardly facing cavity (32) of the neck mold. A container (C) is produced in the molding apparatus from a parison of a heated thermoplastic material by introducing pressurized blowing fluid into the container being formed by way of a blow pin assembly (16) that is reciprocable relative to the blow mold. The blow pin assembly has an inner tubular member (20) with a free end that is within the container during blowing, and an outer tubular member (22) that surrounds the inner tubular member and defines an annulus therewith for withdrawing spent blowing fluid from the container. The outer tubular member has radial ports (24) for directing spent blowing fluid against a moil (M) being formed at a rim (R) of a finish (F) of the container. A restricted outlet from the finish of the container is obtained by providing the anvil with an inwardly and downwardly directed nose portion (34) to form a restricted annular portion (P) in the finish at a location below the rim.

6 Claims, 4 Drawing Sheets

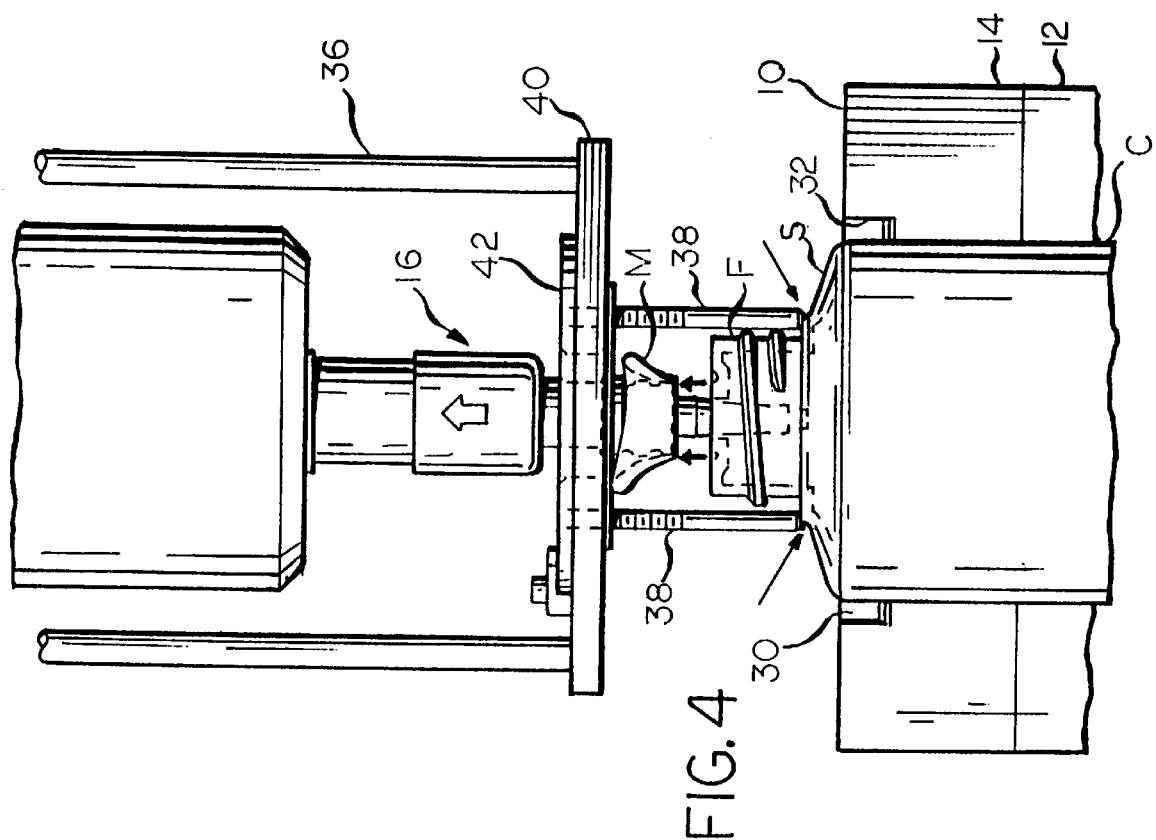
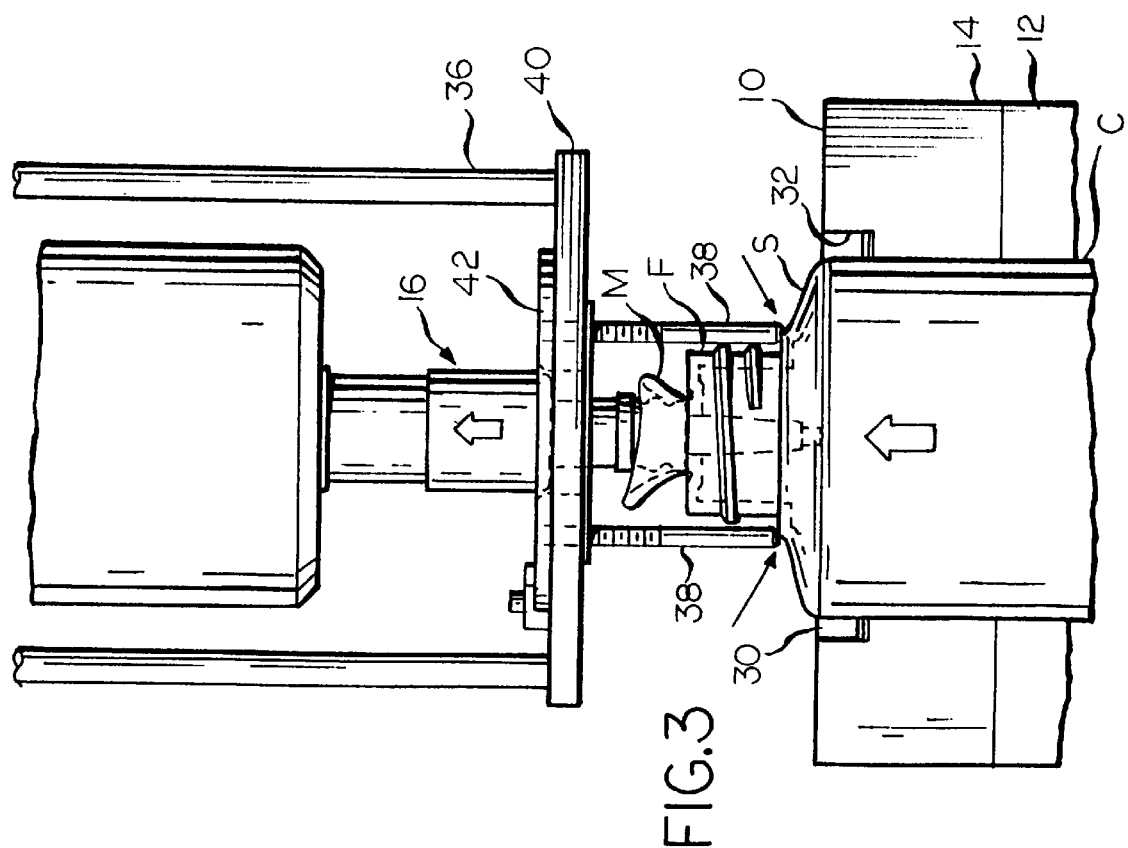

EXTRUSION BLOW MOLDING APPARATUS FOR MANUFACTURE OF THERMOPLASTIC CONTAINERS

FIELD OF THE INVENTION

This invention relates to improvements in apparatus for the manufacture of thermoplastic containers by the extrusion blow molding process, a process that is occasionally referred to as the "shuttle" blow molding process. More particularly, this invention relates to improvements in apparatus of the foregoing character that permit the manufacture of containers with restricted outlets. The invention also relates to improvements in apparatus of the foregoing character that permit the manufacture of containers with more precisely formed rims. The invention also relates to improvements in apparatus of the foregoing character that permit the removal of the moil from the containers before the containers impact a removal conveyor.

BACKGROUND OF THE INVENTION

In the manufacture of thermoplastic containers by the shuttle blow molding process, the threaded or otherwise configured closure receiving neck portion of the container, which is commonly referred to as the "finish" of the container, is formed by a neck mold that is positioned against an outermost end surface of a body mold cavity in which the body portion of the container is blown from a previously extruded form or parison of the container. The blowing of the container is done by air or another gas that is introduced into the parison within the mold cavity by a blow pin that extends through the neck mold into the parison within the body mold. The blow pin reciprocates with respect to the neck mold and body mold, and an anvil of a hard material is positioned within an open-ended cavity on the outermost surface of the neck mold to prevent impact damage to the neck mold as the blow pin reciprocates with respect to the neck mold.

In the manufacture of thermoplastic containers by the extrusion blow molding process, heretofore it has been very difficult to produce a container with an internal control diameter at or near the top of its finish, the "C" dimension in industry nomenclature, than the minimum internal diameter at or near the bottom of the finish, the "I" diameter in industry nomenclature. However, for proper dispensing of the packaged product, when the packaged product is a liquid, it is often important that the size of the opening at the "C" dimension be substantially smaller than the "I" dimension. Heretofore, this has usually been accomplished by inserting a separate annular fitment in the outlet of the container finish. This added element, and the assembly step involved in its insertion in a container, however, add to the expense involved in the manufacture of restricted outlet liquid containers by the extrusion blow molding process.

Another problem encountered in the manufacture of thermoplastic containers by the extrusion blow molding process, according to prior art techniques, relates to dimensional variations in the rims of such containers resulting from the time required to properly cool the portion of the container to be removed from the rim, often called a "moil," at the conclusion of the blow molding process.

Another problem encountered in the manufacture of thermoplastic containers by the extrusion blow molding process, according to prior art techniques, relates to the removal of the moils from the containers at the conclusion of the molding process, especially containers produced with a restricted outlet. Heretofore, stripper plates, which are conventionally used to remove moils from other types of extrusion blow molded containers, were not effective in removing moils from restricted outlet containers of such type, and such moils often disengaged from the containers in an uncontrolled manner upon impact of the containers with a removal conveyor.

BRIEF DESCRIPTION OF THE INVENTION

The aforesaid and other problems heretofore associated with the manufacture of containers by the extrusion blow molding process are solved by the apparatus of the present invention in which the container is provided with a "C" dimension that is substantially smaller than its "I" dimension, to eliminate the need for inserting a separate fitment into the container to be able to properly control the rate of flow of liquid from the container, and this is done by providing the anvil used in such process with an annular, transversely extending partition at an elevation that will occur within the finish of the container, near but below the rim of the container. Such anvil partition will then serve to mold a restricted diameter annular partition within the container neck in addition to performing its historical function of preventing neck damage to the adjacent neck mold of the apparatus, and the restricted diameter annular partition thereby formed within the container finish will be an integral part of a single piece container and finish.

The extrusion blow molded apparatus of the present invention also provides containers with more precisely defined finishes by the use of a blow pin assembly that exhausts spent cooling air in an annulus that surrounds a cooling air inlet tube, and the exhausted spent cooling air is exhausted from the annulus of the blow pin assembly against the moil portion of the container being molded, that is, the annular portion of the container that projects outwardly from the rim at the finish of the container, such moil portion normally being trimmed from the container during or after its discharge from the mold. This spent cooling air discharge technique serves to accelerate the cooling of the moil, and to a lesser extent the cooling of the finish itself, and this acceleration of the cooling rates in the region of the finish of the container will help to reduce the distortion of the container finish that occurs when finish cooling occurs more slowly.

The extrusion blow molding apparatus of the present invention also provides for the stripping, or removal, of the moil section of a blow molded container with a restricted outlet before the container is removed from the mold, and therefore before the container is impacted against a removable conveyer, an action that heretofore was not consistently possible. According to the present invention, at the conclusion of the molding cycle the mold opens and the blow pin assembly is retracted relative to the mold. The shoulder of a tube of the blow pin assembly is stopped by a pair of tube drop rods, and the stem of the blow pin assembly continues to rise. The moil of the container, now detached or partly detached from the container finish because it engages the exterior of the blow pin assembly, is held up by a stripper doughnut insert. The stem of the blow pin assembly continues to rise through the stripper doughnut insert, which causes the moil to disengage from the blow pin assembly and fall to a conveyer below the mold.

Accordingly, it is an object of the present invention to provide an improved extrusion blow molding apparatus for the manufacture of thermoplastic containers. More particularly, it is object of the present invention to provide improved apparatus of the foregoing character that can be used to manufacture containers with restricted outlets. It is also an object of the present invention to provide apparatus of the foregoing character that provides for accelerated cooling of the molded container in the region of the moil at the rim of the container to thereby improve the definition of the finish of the container. It is also an object of the present invention to provide apparatus of the foregoing character that is capable of stripping the moil of the container from the container prior to the discharge of the container from the mold in which it was blown.

For a further understanding of the present invention and the objects thereof, attention is directed to the drawing and the following brief description thereof, to the detailed description of the preferred embodiment and to the appended claims.

BRIEF DESCRIPTION OF THE DRAWING

FIG. 3 is a fragmentary elevational view, at a reduced scale, of a portion of the apparatus of FIGS. 1 and 2 showing a step in the extrusion blow molding process occurring after the step illustrated in FIGS. 1 and 2;

FIG. 4 is a view similar to FIG. 3 showing a subsequent step in the manufacture of containers according to the preferred embodiment of the present invention;

DETAILED DESCRIPTION OF THE PREFERRED EMBODIMENT

Figure 1:
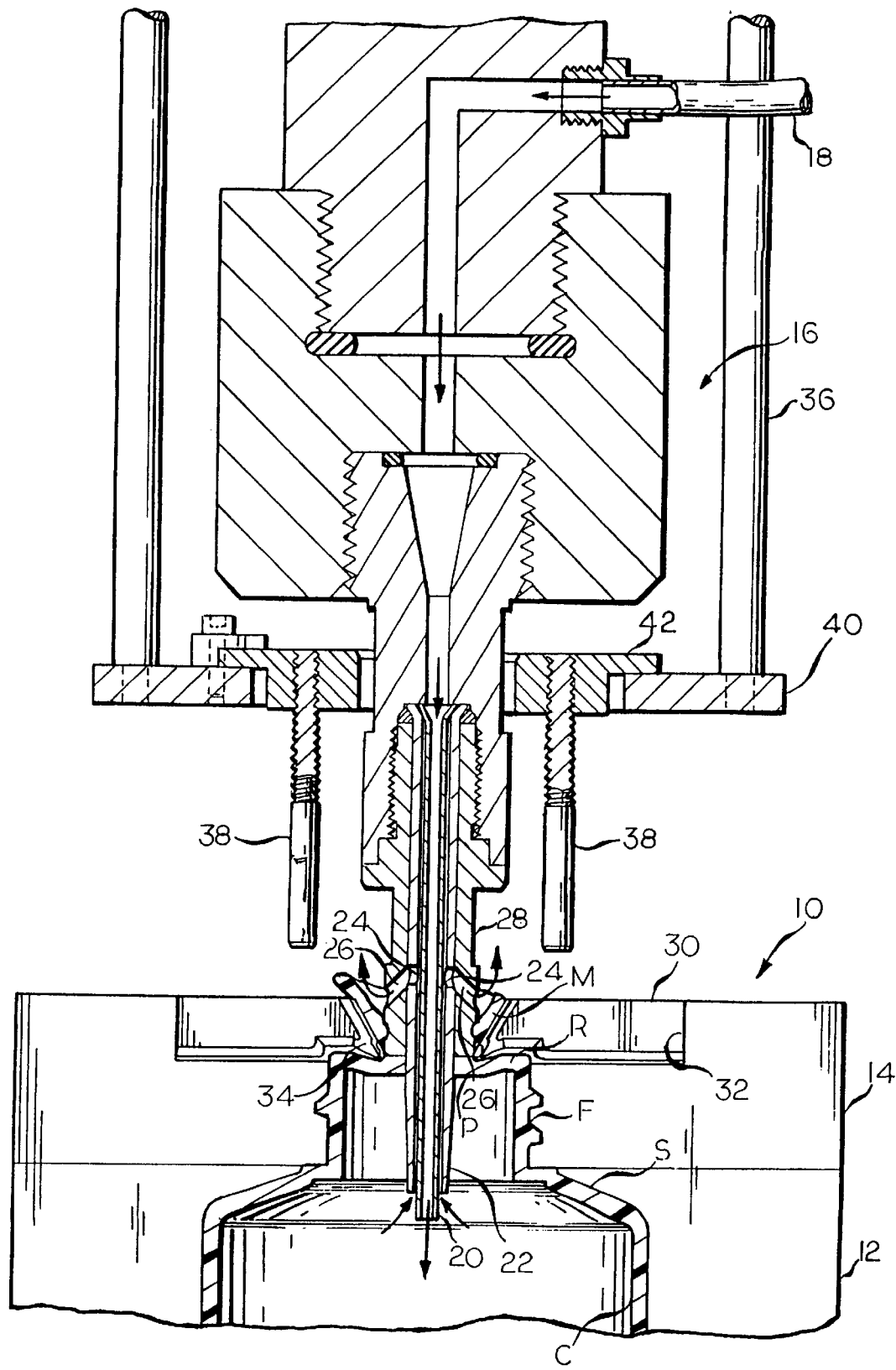
FIG. 1 is a fragmentary elevational view, partly in cross-section, of apparatus according to the preferred embodiment of the present invention for blow molding a container from a thermoplastic material according to the extrusion blow molding process.
Figure 2:
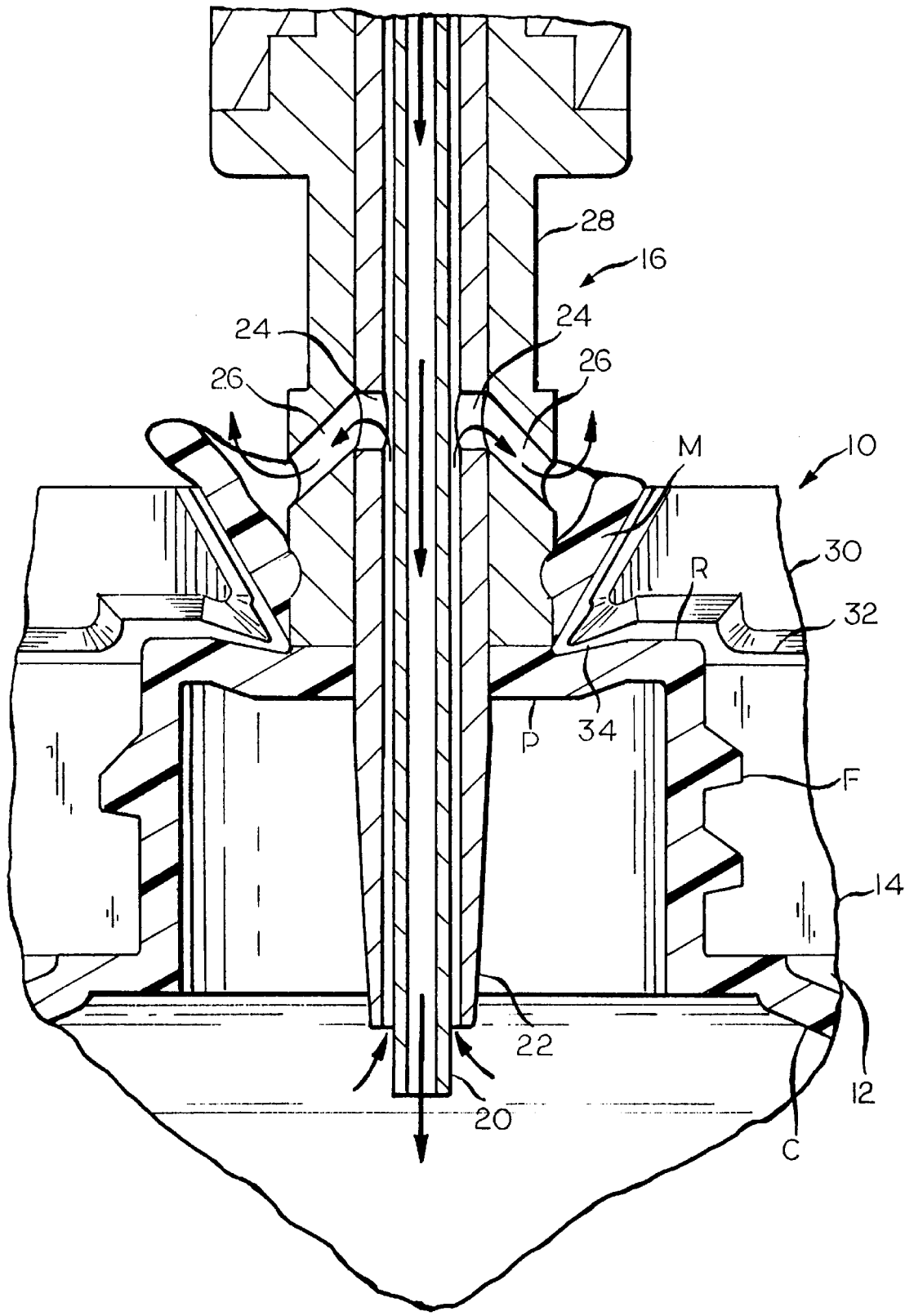
FIG. 2 is a fragmentary view, at an enlarged scale, of a portion of the apparatus shown in FIG. 1.
Figure 6:
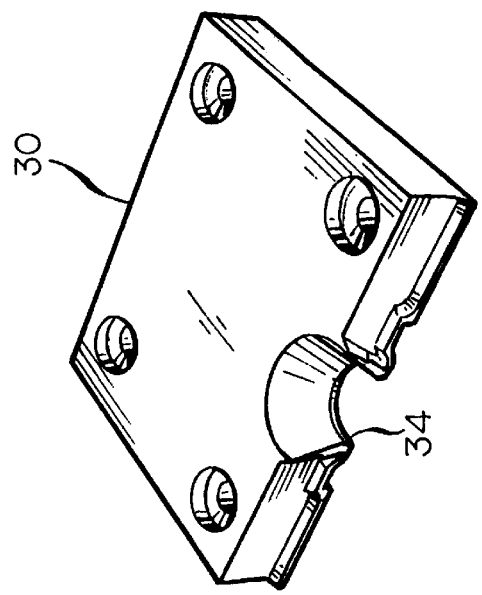
FIG. 6 is a perspective view showing a detail of the apparatus of FIGS. 1 and 2.

The container C is shown in FIGS. 1 and 2 being molded in blow molding apparatus according to the present invention, such apparatus being generally identified by reference numeral 10. As shown in FIGS. 1 and 2, the blow molding apparatus 10 is made up of a blow mold 12 in which a body portion of the container C is formed by blowing, and a neck mold 14 in which a threaded or otherwise configured closure receiving finish portion F of the container C is formed. In that regard, the blow mold 12 is made up of opposed, semi-cylindrical mold halves, which, when joined end-to-end, define a cavity corresponding in configuration to the exterior of the body portion of the container C; likewise, the neck mold 14 is made up of an opposed, like pair of mold halves which, when joined end-to-end, define a cavity whose configuration corresponds to the exterior of the finish F of the container C.

In the manufacture of containers by an extrusion blow molding process, in which the blow molding apparatus 10 is adapted to be used, containers are produced from extruded forms, often called parisons, which are produced elsewhere in an extrusion blow molding machine and are then transferred to a blow molding station for blowing into containers. In any event, the containers C are blown from extruded parisons that are extruded from a melt of a thermoplastic material, such as polypropylene or high density polyethylene, as is known in the art, and the blow molding process occurs while such thermoplastic material is at an elevated temperature.

The container C is blown in the blow molding apparatus by blowing air or other gaseous medium that is introduced in the container C while the container C is in the blow mold 12 of the blow molding apparatus 10 by air that is introduced through a blow pin assembly, which is generally indicated by reference numeral 16. The blow pin assembly 16, which is reciprocable relative to the blow mold 12, receives blowing air through an inlet line 18, and the blowing air, which is cooler than the parison to be blown into the container C, passes from the air inlet line 18 into the interior of the parison to be blown into a container in the blow mold 12 through an air introduction tube 20. Spent blowing air from the container being blown in the blow mold 12 is withdrawn therefrom in an annulus that is defined by the exterior of the air introduction tube 20 and the interior of an annular tube 22, whose free end terminates within a container C short of the termination of a free end of the air introduction tube 20. Radial exhaust ports 24 are formed in the annular tube 22 at the location of an annular moil portion M that is formed at a rim R of the annular finish portion F of the container C, and spent blowing air from the annular tube 22, which is still cooler than the moil M of the container C, is directed against the moil M through the exhaust ports 24 and through radially aligned ports 26 in an annular member 28 that supports an exterior free end portion of the annular tube 22. This cooling of the moil M, which results in cooling of the finish F to a lesser extent, results in less thermal distortion of the finish F than would otherwise occur in an arrangement where cooling proceeded more slowly, and results in a more precisely defined finish F because of such accelerated cooling.

Because of the reciprocation of the blow pin assembly relative to the blow mold 12, as heretofore described, impact loads would be borne by the neck mold 14 but for the presence of an anvil 30, of a hard material which is made up of opposed, semi-cylindrical elements joined end-to-end to form an annular opening. The anvil 30 is placed against the exterior of the neck mold 14, specifically, in an open cavity 32 thereof. In the present case, the anvil 30 has an inwardly and downwardly projecting nose portion 34 that projects into the finish F of the container C to form, with the exterior of the blow pin assembly 16, a transversely extending annular partition P integrally with the container C and at a location slightly below the rim of the finish F. The inside diameter of the partition P, then, becomes the "C" dimension of the container finish F, and the "C" dimension can be substantially smaller than the "I" dimension of the finish F, which will occur near the juncture of the finish F and a shoulder portion S of the container C. With such a restricted "C" dimension, it becomes unnecessary to insert a separate fitment into the outlet of the finish F to reduce the rate at which liquid or other product packaged in the container C can be withdrawn therefrom.

At the conclusion of the molding of the container C in the blow molding apparatus 10, the neck mold 14, with the anvil 30, is removed form the blow molding apparatus 10, and the blow pin assembly 16 begins to be retracted from the blow molding apparatus 10 relative to the blow mold 12 and to fixed support structure 36. This has the effect of lifting the container C out of the blow mold 12 by virtue of bonding between the blow pin assembly 16 and the thermoplastic material in the container C, and specifically between the blow pin assembly 16 and the thermoplastic material in the moil M of the container C. This motion continues until the shoulder S of the container C engages the free ends of a pair of downwardly depending drop rods 38 that depend from a donut insert 42 of stripper plate 40, which is releasably secured to the support structure 36, the releasable connection between the donut insert 42 and the support structure 36 permitting the substitution of a different donut insert 42, with drop rods 38 that depend a different distance therefrom, as required to process containers C of a different configuration. This is the condition depicted in FIG. 3.

Figure 5:
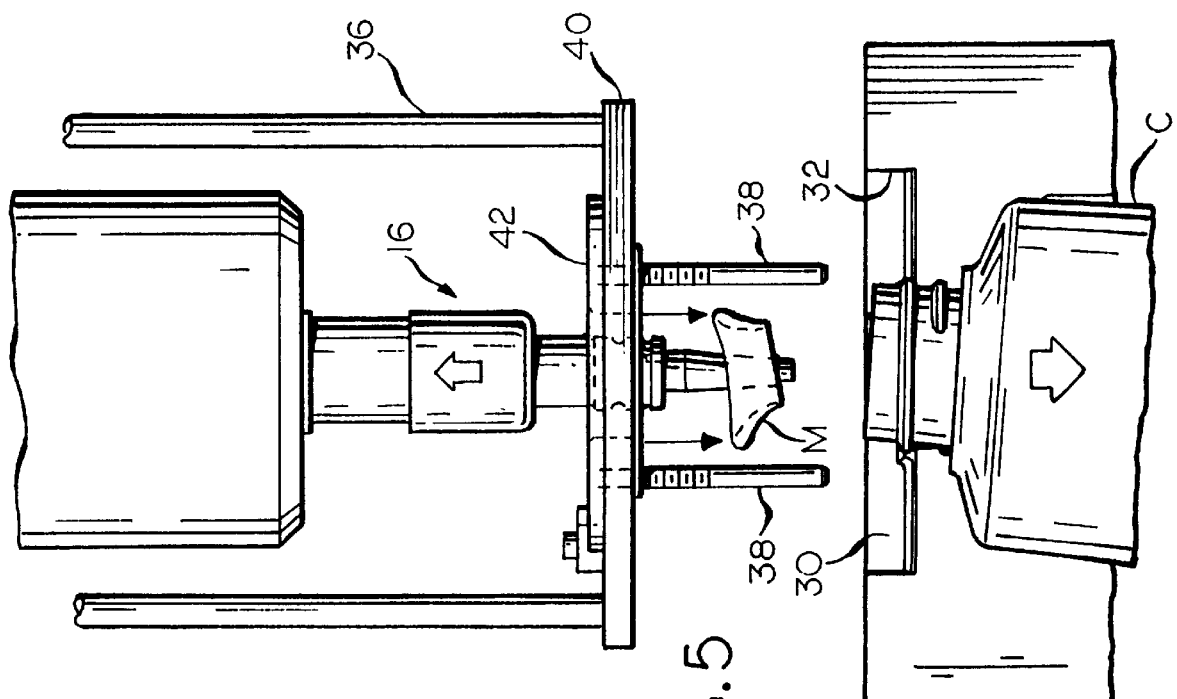
FIG. 5 is a view similar to FIGS. 3 and 4 showing another subsequent step in the manufacture of containers according to the extrusion blow molding process of the present invention.

As is shown in FIG. 4, the blow pin assembly 16 continues to be withdrawn relative to the blow mold 12 and relative to the support structure 36. However, the container C is no longer free to move relative to the blow mold 12 because of the engagement of the shoulder S of the container C by the drop rods 38. Nevertheless, the continued retraction of the blow pin assembly 16 will cause the moil M of the container C to separate from the finish F of the container C because of the bonding of the interior of the moil M to the exterior of the blow pin assembly 16, and the moil M will thereby be separated from the container C before the container C is withdrawn from the mold 12. The moil M can then be disposed of at a location away from the mold 12, and no separate moil removal step need be performed on the container C after its removal from the mold 12, the removal of the moil M from the blow pin assembly 16 being shown in FIG. 5.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. Molding apparatus for molding a container from a parison of a blowable thermoplastic material, said molding apparatus comprising:

mold means having an internal cavity for surrounding a portion of a blowable thermoplastic material for forming the exterior of a container when the parison is subjected to internal blowing pressure to form it into the container, said mold means having a restricted opening that forms a configured finish portion of the container, the finish portion having a rim at a free end thereof;

an anvil of a hard material positioned against said mold means at said restricted opening, said anvil having an annular restricted opening that is coaxial with and substantially smaller than said restricted opening of said mold means at a location below the rim of the container being formed in the mold means to form a transversely extending partition within the container at a location below the rim; and reciprocating blow pin means adapted to abut against said anvil for introducing pressurized blowing fluid into the parison to cause at least a body portion of the parison to take the shape of the internal cavity of the mold means;

wherein said mold means comprises a blow mold for molding the body portion of the container and a neck mold having a cavity for molding the finish portion of the container, said anvil being positioned within the cavity of said neck mold and away from said blow mold.

2. A molding apparatus according to claim 1 wherein said neck mold and said anvil are removable from said blow mold in unison.

3. A molding apparatus according to claim 1 wherein said blow pin means comprises:

an inner tubular member for introducing the pressurized fluid into the parison; and an outer tubular member surrounding said inner tubular member and defining an annulus with said inner tubular member for withdrawing spent pressurized fluid from the parison being blown into the container, said outer tubular member having radial port means aligned with a moil portion being formed at the rim of the finish of the container for cooling the moil by directing spent pressurized fluid thereagainst.

4. A molding apparatus according to claim 1 and further comprising:

moil removal means for removing a moil from the finish portion of the container as the container is being removed from the blow mold, after removal of the neck mold and the anvil from the blow mold.

5. A molding apparatus according to claim 4 wherein said moil removal means comprises:

a stationary stripper plate means;

drop rod means depending from said stationary stripper plate means for engaging a shoulder of the container upon the partial removal of the container from the blow mold during partial withdrawal of said blow pin assembly from said blow mold, and for precluding further withdrawal of the container from said blow mold upon further withdrawal of said blow pin assembly from said blow mold;

whereby further withdrawal of said blow pin assembly from said blow mold will separate the moil from the container by virtue of bonding between an interior of the moil and an exterior of said blow pin assembly.

6. Apparatus for separating an annular moil from a rim of a finish of a container being produced from a heated thermoplastic material by extrusion blow molding, said apparatus comprising:

stripper plate means, said stripper plate means being fixed in its position;

drop rod means depending from said stripper plate means for engaging a shoulder of a container being withdrawn from a mold by partial withdrawal of a blow pin assembly with respect to the mold, further withdrawal of the blow pin assembly being effective, by engagement of an inner surface of the moil and an outer surface of the blow pin assembly, to separate the moil from the finish of the container.

* * * * *